United States Patent
Gilbert et al.

(10) Patent No.: US 11,305,886 B1
(45) Date of Patent: Apr. 19, 2022

(54) GRAPHICAL USER INTERFACE IN A COMPUTER SYSTEM IN AN AIRCRAFT

(71) Applicant: The Boeing Company, Chicago, IL (US)

(72) Inventors: Brian David Gilbert, Kenmore, WA (US); Alireza Majd, Seattle, WA (US); Paul D. Burkhead, Seattle, WA (US); Alessandro Edward Galli, Seattle, WA (US); John Wiedemann, Bothell, WA (US)

(73) Assignee: The Boeing Company, Chicago, IL (US)

( * ) Notice: Subject to any disclaimer, the term of this patent is extended or adjusted under 35 U.S.C. 154(b) by 70 days.

(21) Appl. No.: 16/434,763

(22) Filed: Jun. 7, 2019

Related U.S. Application Data

(63) Continuation of application No. 16/049,112, filed on Jul. 30, 2018, now abandoned.

(51) Int. Cl.
| | |
|---|---|
| *B64D 43/00* | (2006.01) |
| *G08G 5/00* | (2006.01) |
| *G06F 3/04847* | (2022.01) |
| *G06F 3/0482* | (2013.01) |
| *B64D 45/00* | (2006.01) |

(52) U.S. Cl.
CPC ............ *B64D 43/00* (2013.01); *B64D 45/00* (2013.01); *G06F 3/0482* (2013.01); *G06F 3/04847* (2013.01); *G08G 5/0021* (2013.01); *G08G 5/0056* (2013.01); *B64D 2045/0085* (2013.01)

(58) Field of Classification Search
None
See application file for complete search history.

(56) References Cited

U.S. PATENT DOCUMENTS

| | | | |
|---|---|---|---|
| 6,419,188 B1 * | 7/2002 | Chapman, Jr. ......... | B64D 43/00 244/118.6 |
| 7,321,318 B2 * | 1/2008 | Crane ................... | G01C 23/005 340/971 |
| 8,159,464 B1 * | 4/2012 | Gribble ................. | G06F 3/0416 345/173 |

(Continued)

OTHER PUBLICATIONS

K. T. Snyder, S. Sokoloff and M. Bearden, "The cockpit associate: A "co-pilot in a box" for general aviation," Digital Avionics Systems Conference, 2003. DASC '03. The 22nd, Indianapolis, In, USA, 2003, p. 12.C.3-121-12 vol.2, doi: 10.1109/DASC .2003.1245953. (Year: 2003).*

(Continued)

*Primary Examiner* — William L Bashore
*Assistant Examiner* — Nathan K Shrewsbury
(74) *Attorney, Agent, or Firm* — Yee & Associates, P.C.

(57) ABSTRACT

A method, apparatus, and system for displaying information for an aircraft on a display device in a flight deck of the aircraft. A computer system in the aircraft displays a dynamic home page in a graphical user interface on the display device in the flight deck of the aircraft. The information in the dynamic home page is based on the information used to operate the aircraft during a current phase of flight. The computer system changes the information in the dynamic home page as the current phase of flight changes or non-normal conditions occur during operation of the aircraft.

23 Claims, 16 Drawing Sheets

(56) References Cited

U.S. PATENT DOCUMENTS

| | | | | |
|---|---|---|---|---|
| 8,590,839 | B2* | 11/2013 | Giannelli | B64D 43/00 244/129.1 |
| 8,874,288 | B1* | 10/2014 | Siddiqui | G08G 5/0091 701/14 |
| 8,892,274 | B2* | 11/2014 | Baudry | B64C 19/00 701/3 |
| 9,302,779 | B2* | 4/2016 | Zaneboni | B64D 11/00 |
| 9,452,839 | B2* | 9/2016 | Chatrenet | B64D 11/00153 |
| 9,567,098 | B2* | 2/2017 | Kou | G01C 23/00 |
| 9,703,476 | B1* | 7/2017 | Pappas | G06F 3/04886 |
| 9,710,145 | B2* | 7/2017 | Zammit-Mangion | G06F 3/0488 |
| 9,772,712 | B2* | 9/2017 | Kneuper | B64D 43/00 |
| 9,989,991 | B1* | 6/2018 | Kuefler | G06F 1/1601 |
| 10,761,676 | B1* | 9/2020 | Gilbert | G06F 3/1454 |
| 2004/0210847 | A1* | 10/2004 | Berson | G06F 11/324 715/788 |
| 2006/0184253 | A1* | 8/2006 | Andrews | G01C 23/00 700/17 |
| 2007/0176797 | A1* | 8/2007 | Rhodes | G01C 21/26 340/995.15 |
| 2008/0282201 | A1* | 11/2008 | Cabaret | G06F 3/038 715/856 |
| 2009/0153343 | A1* | 6/2009 | Shafaat | G08G 5/0078 340/686.1 |
| 2011/0102198 | A1* | 5/2011 | Deleris | B64D 43/00 340/971 |
| 2011/0313597 | A1* | 12/2011 | Wilson | G01C 23/00 701/3 |
| 2012/0035849 | A1* | 2/2012 | Clark | G01C 23/00 701/467 |
| 2012/0075123 | A1* | 3/2012 | Keinrath | G06Q 10/06 340/963 |
| 2012/0075166 | A1* | 3/2012 | Marti | G02B 27/0093 345/1.1 |
| 2013/0138272 | A1* | 5/2013 | Louise-Babando | G06F 3/04847 701/14 |
| 2013/0234867 | A1* | 9/2013 | Martin | G01C 23/005 340/971 |
| 2013/0265177 | A1* | 10/2013 | Berger | G01C 23/00 340/945 |
| 2014/0075075 | A1* | 3/2014 | Morrill | G06F 1/1632 710/303 |
| 2014/0156115 | A1* | 6/2014 | Aymeric | G06F 3/04817 701/3 |
| 2014/0209740 | A1* | 7/2014 | Guering | B64D 45/00 244/118.5 |
| 2015/0058777 | A1* | 2/2015 | Graumann | G06F 3/04842 715/771 |
| 2015/0261379 | A1* | 9/2015 | Kneuper | G08G 5/0052 345/173 |
| 2016/0123763 | A1* | 5/2016 | Wischmeyer | G01C 23/00 701/14 |
| 2016/0347176 | A1* | 12/2016 | Kawalkar | B60K 35/00 |
| 2017/0075558 | A1* | 3/2017 | Shapiro | G09G 5/38 |
| 2017/0259935 | A1* | 9/2017 | Hausmann | G06F 3/041 |
| 2017/0275018 | A1* | 9/2017 | Narra | B64D 45/00 |
| 2017/0277185 | A1* | 9/2017 | Duda | B64D 43/00 |
| 2018/0061243 | A1* | 3/2018 | Shloosh | G08G 5/0091 |
| 2019/0096267 | A1* | 3/2019 | Shamasundar | G08G 5/0013 |
| 2019/0375514 | A1* | 12/2019 | Lampazzi | G09G 5/38 |
| 2019/0384490 | A1* | 12/2019 | Morowsky | G06F 3/04842 |
| 2020/0241565 | A1* | 7/2020 | Bosworth | G06K 9/6202 |

OTHER PUBLICATIONS

S. S. Mulgund and G. L. Zacharias, "A situation-driven adaptive pilot/vehicle interface," Proceedings Third Annual Symposium on Human Interaction with Complex Systems. HICS'96, Dayton, Oh, USA, 1996, pp. 193-198, doi: 10.1109/HUICS.1996.549515. (Year: 1996).*

E. Letsu-Dake, D. Pepitone, J. Ball and R. Burgin, "Recommendations for managing complexity in electronic chart information displays," 2014 IEEE/AIAA 33rd Digital Avionics Systems Conference (DASC), Colorado Springs, CO, 2014, pp. 4B1-1-4B1-14, doi: 10.1109/DASC.2014.6979467. (Year: 2014).

Final Office Action, dated Feb. 22, 2021, regarding U.S. Appl. No. 16/434,720, 19 pages.

Notice of Allowance, dated Apr. 30, 2020, regarding U.S. Appl. No. 16/140,885, 9 pages.

Notice of Allowance, dated Jun. 2, 2021, regarding U.S. Appl. No. 17/007,788, 14 pages.

Office Action, dated Jun. 25, 2021, regarding U.S. Appl. No. 16/434,720, 19 pages.

Office Action, dated Nov. 27, 2020, regarding U.S. Appl. No. 17/007,788, 16 pages.

Office Action, dated Oct. 3, 2019, regarding U.S. Appl. No. 16/140,885, 9 pages.

Office Action, dated Sep. 25, 2020, regarding U.S. Appl. No. 16/434,720, 17 pages.

* cited by examiner

GRAPHICAL USER INTERFACE IN A COMPUTER SYSTEM IN AN AIRCRAFT

CROSS-REFERENCE TO RELATED APPLICATIONS

This application is a Continuation of U.S. application Ser. No. 16/049,112, entitled "Graphical User Interface in a Computer System in an Aircraft", filed Jul. 30, 2018, and incorporated herein by reference.

This application is related to U.S. Ser. No. 16/049,183, entitled "Graphical User Interface in a Computer System in an Aircraft", filed Jul. 30, 2018; and U.S. Ser. No. 16/140,885, entitled "Flight Deck Display Management System", filed Sep. 25, 2018, which are incorporated herein by reference.

BACKGROUND INFORMATION

1. Field

The present disclosure relates generally to aircraft and, in particular, to controlling an operation of an aircraft using a graphical user interface displayed on a display device in a cockpit of the aircraft.

2. Background

Commercial aircraft, such as jet airplanes, are complex, large-capacity aircraft used to transport people, cargo, or some combination thereof. A flight deck of a jet airplane has a myriad of display devices and physical controls used to operate the aircraft. These display devices and physical controls are used to control the operation of aircraft systems such as an engine, a fuel system, hydraulics, a navigation system, a radio, and other systems in the aircraft.

Currently, the different display devices in the flight deck of the aircraft include a primary flight display device, a navigation display device, and an engine-indicating and crew-alerting system (EICAS) display device. These and other display devices in the flight deck of the aircraft provide information to a flight crew to operate the aircraft.

Large amounts of information are displayed on these display devices. For example, the primary flight display device can display information such as airspeed, altitude, attitude, rate of climb, autopilot mode or status, heading, and other information. As another example, the navigation display device can display information such as current heading, course, next waypoint, position, and other information. The engine-indicating and crew-alerting system display can display engine parameters such as revolutions per minute, temperature, fuel flow, fuel quantity, wheel pressure, and other suitable types of information.

These and other display devices require the flight crew to know which display devices to view for the information needed to operate the aircraft. Additionally, once the needed information is located, the flight crew also needs to be able to quickly locate and manipulate physical controls such as switches, levers, or dials to make desired adjustments or changes.

The number of display devices and physical controls can increase the amount of time needed to perform tasks for a flight of an aircraft. Further, these display devices and physical controls can also increase the amount of mental concentration needed to properly perform tasks to operate the aircraft.

Additionally, composition and arrangement of the display devices and physical controls can vary from one aircraft to another aircraft. This variation can limit the types of aircraft that pilots or other flight crew can operate without additional training.

Therefore, it would be desirable to have a method and apparatus that take into account at least some of the issues discussed above, as well as other possible issues. For example, it would be desirable to have a method and apparatus that overcome a technical problem with a number of display devices and physical controls in a flight deck of an aircraft.

SUMMARY

In one illustrative embodiment, an aircraft control system comprises a computer system in an aircraft; a display device in communication with the computer system; and an information controller running on the computer system. The display device is located in a flight deck of the aircraft as forward display. The information controller identifies a current phase of flight of the aircraft during operation of the aircraft from a flight management system in the aircraft and displays a dynamic home page based on the current phase of flight of the aircraft during the operation of the aircraft. The dynamic home page is displayed in a graphical user interface on the display device and the dynamic home page includes information referenced during the current phase of flight to operate the aircraft and a group of controls used during the current phase of flight to operate the aircraft. The information and the group of controls change as the current phase of flight changes, enabling a pilot to operate the aircraft using the home page.

In another illustrative embodiment, an aircraft control system comprises a computer system in an aircraft; a display device in communication with the computer system; and an information controller running on the computer system. The information controller displays a dynamic control center in a region of a graphical user interface based on a current phase of flight of the aircraft. The information in the dynamic control center is based on the information referenced during the current phase of flight to operate the aircraft. The information in the dynamic control center changes as the current phase of flight changes.

In yet another illustrative embodiment, a method is present for displaying information for an aircraft on a display device in a flight deck of the aircraft. A computer system in the aircraft displays a dynamic home page in a graphical user interface on the display device in the flight deck of the aircraft. The information in the dynamic home page is based the information used to operate the aircraft during a current phase of flight. The computer system changes the information in the dynamic home page as the current phase of flight changes during operation of the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it would be desirable to reduce an amount and complexity of information displayed at any one time in a flight deck of an aircraft. The illustrative embodiments recognize and take into account that display devices and physical controls are costly and take up valuable real estate in the flight deck of the aircraft. The illustrative embodiments also recognize and take into account that the display devices and physical controls currently used take up room and add weight to the aircraft. Further, the illustrative embodiments recognize and take into account that the use of these display devices and physical controls reduces pilot comfort as well as ease of ingress and egress to the flight deck.

The illustrative embodiments recognize and take into account that replacing physical controls such as switches, sliders, and dials with graphical controls on a display device can reduce complexity and clutter in the flight deck of the aircraft. Further, the illustrative embodiments also recognize and take into account that one manner in which information and controls can be organized is based on a phase of flight of the aircraft. Further, the illustrative embodiments recognize and take into account that graphical indicators can be used to draw the attention of the flight crew to particular pieces of information that may result in taking action during the operation of the aircraft.

Thus, the illustrative embodiments provide a method, an apparatus, and a system for displaying information on a display device in the flight deck of the aircraft. In one illustrative example, an aircraft control system comprises a computer system in the aircraft, a display device in the computer system, and an information controller running on the computer system. The information controller displays a dynamic control center in a region of a graphical user interface based on a current phase of flight of the aircraft. The information in the dynamic control center is based on the information referenced during the current phase of flight to operate the aircraft. The information in the dynamic control page changes as the current phase of flight changes. This dynamic control center can be displayed on the same display device as the information from other systems such as a flight management system in a navigation system.

Figure 1:
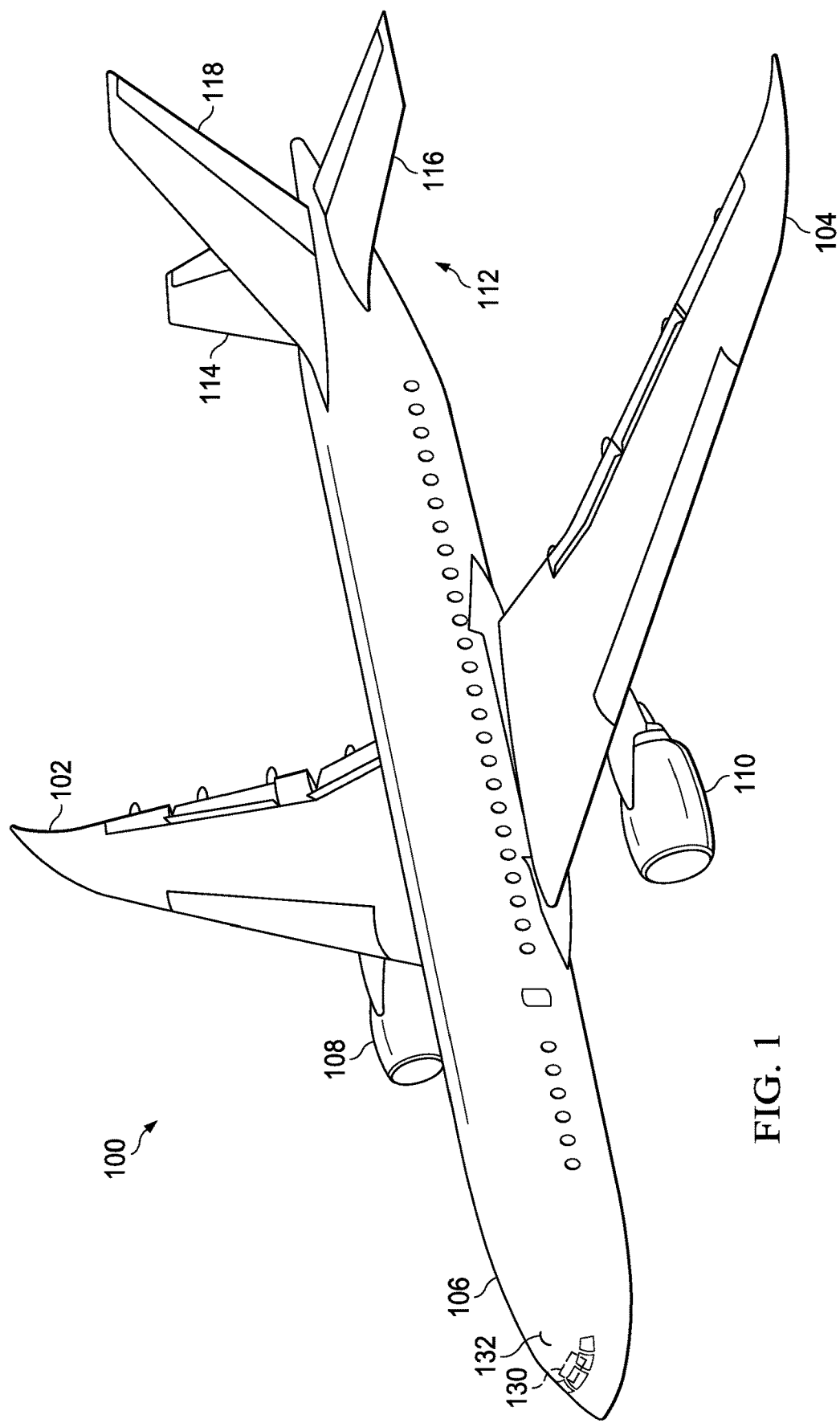
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104. Body 106 has tail section 112. Horizontal stabilizer 114, horizontal stabilizer 116, and vertical stabilizer 118 are attached to tail section 112 of body 106.

Aircraft 100 is an example of an aircraft in which an aircraft control system may be implemented in accordance with an illustrative embodiment. In this illustrative example, display system 130 in the aircraft control system is located in flight deck 132 of aircraft 100. Display system 130 can have a group of display devices utilized by a flight crew to operate aircraft 100. As used herein, "a group of," when used with reference to items, means one or more items. For example, "a group of display devices" is one or more display devices.

In this illustrative example, display system 130 includes a display device that operates in a manner that reduces at least one of a need for physical controls, complexity of information displayed, or enables directing attention of the flight crew to updates or changes in information displayed on the display device. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
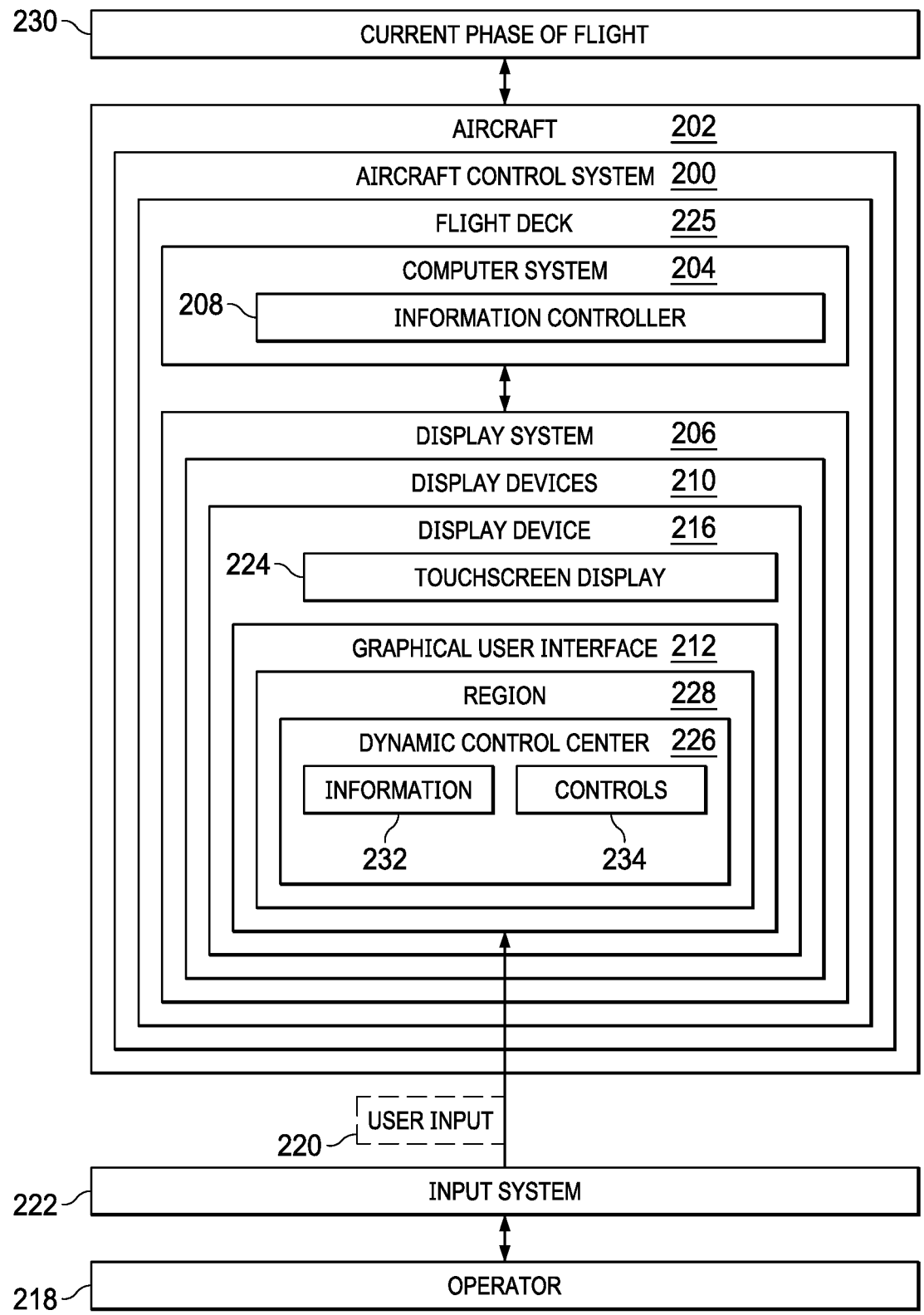
FIG. 2 is an illustration of a block diagram of an aircraft control system in accordance with an illustrative embodiment.

With reference now to FIG. 2, an illustration of a block diagram of an aircraft control system is depicted in accordance with an illustrative embodiment. In this illustrative example, aircraft control system 200 is located in aircraft 202. Aircraft 100 in FIG. 1 is an example of one implementation for aircraft 202 shown in block form in this figure.

In this illustrative example, aircraft control system 200 includes a number of different components. As depicted, aircraft control system 200 comprises computer system 204, display system 206, and information controller 208.

Computer system 204 is a physical hardware system and includes one or more data processing systems. When more than one data processing system is present, those data processing systems are in communication with each other using a communications medium. The communications medium may take different forms. In this example, the communications medium may include an Aeronautical Radio Incorporated (ARINC) bus system, a wireless network, a fiber-optic network, a wired network, or other types of communications mediums.

The data processing systems in computer system 204 can take a number of different forms. For example, the data processing systems may be selected from at least one of a computer, a server computer, a tablet, a line replaceable unit (LRU), or some other suitable data processing system.

As depicted, display system 206 is a physical hardware system and includes one or more of display devices 210 on which graphical user interface 212 may be displayed. Display devices 210 may include at least one of a light-emitting diode (LED) display, a liquid crystal display (LCD), a touch screen display, an organic light-emitting diode (OLED) display, a computer monitor, a projector, a flat panel display, or some other suitable device that can output information for a presentation of the information.

In this illustrative example, display system 206 is configured to display graphical user interface 212 on display device 216 in display devices 210. Operator 218 is a person that may interact with graphical user interface 212 through user input 220 generated by input system 222 for computer system 204. Input system 222 is a physical hardware system and may be selected from at least one of a mouse, a keyboard, a trackball, a touchscreen, a stylus, a motion sensing input device, a cyber glove, or some other suitable type of input device. In this particular example, display device 216 is touchscreen display 224 in which at least a portion of input system 222 is integrated into display device 216.

As depicted, display device 216 is located in flight deck 225. Display device 216 can be a forward display in flight deck 225. In this illustrative example, operator 218 is a number of flight crew for aircraft 202. In particular, operator 218 can be a pilot of aircraft 202.

As depicted, information controller 208 runs on computer system 204. In this illustrative example, information controller 208 displays dynamic control center 226 in region 228 of graphical user interface 212 based on current phase of flight 230 of aircraft 202.

In this illustrative example, information 232 is displayed in dynamic control center 226 based on current phase of flight 230 of aircraft 202. Information 232 is selected to provide relevant information to the flight crew for use in operating aircraft 202 at a particular point in time.

In the illustrative examples, the information is selected as information relevant for use by the flight crew during a particular phase of flight of aircraft 202. In other words, the information is information that the flight crew uses during current phase of flight 230 to perform various actions or tasks involved with operating aircraft 202. In this illustrative example, current phase of flight 230 is selected from a group comprising on ground, climbing and cruise, descent and landing, at a gate, taxiing, a take-off, climbing, cruising, or other phases of flight.

As depicted, current phase of flight 230 can be identified by information controller 208 using a data processing system within computer system 204. For example, current phase of flight 230 can be identified using information received or requested from a data processing system in the form of a flight management system in computer system 204 in aircraft 202. With this example, the flight management system can use position information and a flight plan managed by the flight management system to identify current phase of flight 230 and communicate this information to information controller 208.

As another example, current phase of flight 230 can take the form of on ground, climbing and cruise, descent and landing. These phases of flight can also be detected using a flight management system. For example, on ground can be detected by default when aircraft 202 is powered up on the ground. Climbing and cruise can be detected when the landing gear is retracted. Descent and landing can be detected when aircraft 202 begins a descent from a cruising altitude.

Information 232 in dynamic control center 226 is based on information referenced during current phase of flight 230 to operate aircraft 202. Further, information controller 208 also displays a group of controls 234 in dynamic control center 226 based on current phase of flight 230. At least one of information 232 or a group of controls 234 in the dynamic control center 226 changes as current phase of flight 230 changes.

The group of controls 234 is graphical controls. These controls can be manipulated through user input 220 to touchscreen display 224 by operator 218.

Information controller 208 may be implemented in software, hardware, firmware, or a combination thereof. When software is used, the operations performed by information controller 208 may be implemented in program code configured to run on hardware, such as a processor unit. When firmware is used, the operations performed by information controller 208 may be implemented in program code and data and stored in persistent memory to run on a processor unit. When hardware is employed, the hardware may include circuits that operate to perform the operations in information controller 208.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In one illustrative example, one or more technical solutions are present that overcome a technical problem with the number of display devices and controls in the flight deck of an aircraft.

As a result, one or more technical solutions may provide a technical effect of at least one of reducing the number of display devices or physical controls used in the flight deck of an aircraft. Further, one or more technical solutions also may provide a technical effect of enabling the flight crew of an aircraft to more easily find information relevant to the operation of the aircraft during a particular phase of flight.

As a result, computer system 204 operates as a special purpose computer system in which information controller 208 in computer system 204 enables displaying dynamic control center 226 to operator 218 with information 232 and controls 234 that dynamically changes when current phase of flight 230 changes. In particular, information controller 208 transforms computer system 204 into a special purpose computer system as compared to currently available general computer systems that do not have information controller 208.

Figure 3:
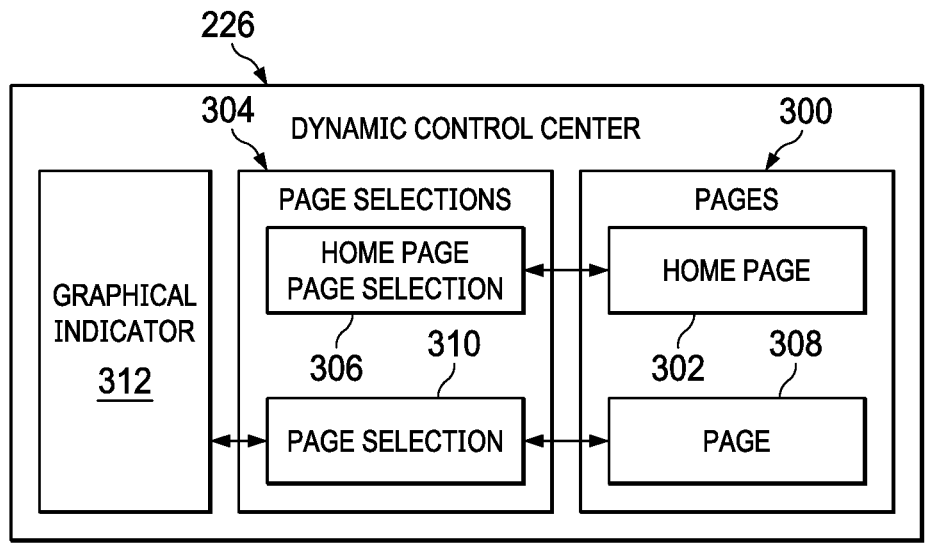
FIG. 3 is an illustration of a block diagram of a dynamic control center in accordance with an illustrative embodiment.

With reference now to FIG. 3, an illustration of a block diagram of a dynamic control center is depicted in accordance with an illustrative embodiment. In the illustrative examples, the same reference numeral may be used in more than one figure. This reuse of a reference numeral in different figures represents the same element in the different figures.

As depicted, information controller 208 displays pages 300 in dynamic control center 226. For example, information controller 208 displays dynamic home page 302 as one of pages 300 in dynamic control center 226. In this illustrative example, pages 300 also include at least one of a flight plan page, a performance page, an air traffic control page, a communications page, an audio page, a setup page, or other suitable types of pages that can be used to display information 232 used to operate aircraft 202 in FIG. 2.

Pages 300 can be implemented in a number of different ways. For example, pages 300 can be web pages that include dynamic content such as information 232 that changes as current phase of flight 230 in FIG. 2 changes to reflect information that is relevant or needed for operating aircraft 202 current phase of flight 230.

In this illustrative example, information controller 208 also displays page selections 304 including home page selection 306 for dynamic home page 302 in dynamic control center 226. Page selections 304 may take the form of tabs or other graphical elements.

Information controller 208 displays page 308 in pages 300 assigned to page selection 310 in page selections 304 when user input 220 in FIG. 2 selects page selection 310. This user input can be generated by operator 218 in FIG. 2 touching the display of page selection 310 in dynamic control center 226 in graphical user interface 212 displayed on touchscreen display 224 in FIG. 2.

In the illustrative example, dynamic home page 302 is the default page in pages 300 displayed in dynamic control center 226. As depicted in the illustrative example, information controller 208 displays dynamic home page 302 in dynamic control center 226 in graphical user interface 212 on display device 216.

Dynamic home page 302 includes information 232 referenced by operator 218 during current phase of flight 230 to operate aircraft 202 and a group of controls 234 used during current phase of flight 230 to operate aircraft 202. Information 232 and controls 234 in other pages in pages 300 also may be based on at least one of current phase of flight 230 or preselected information that may be referenced at any time during operation of aircraft 202.

Further, information controller 208 displays graphical indicator 312 on page selection 310 when new information is present for page 308 assigned to page selection 310. In this illustrative example, graphical indicator 312 can take a number of different forms. Graphical indicator 312 can be selected as any type of graphic that draws the attention of operator 218 to page selection 310. For example, graphical indicator 312 can be selected from at least one of an icon, flashing text, animation, bolding, font size, color, or some other suitable graphic.

Figure 4:
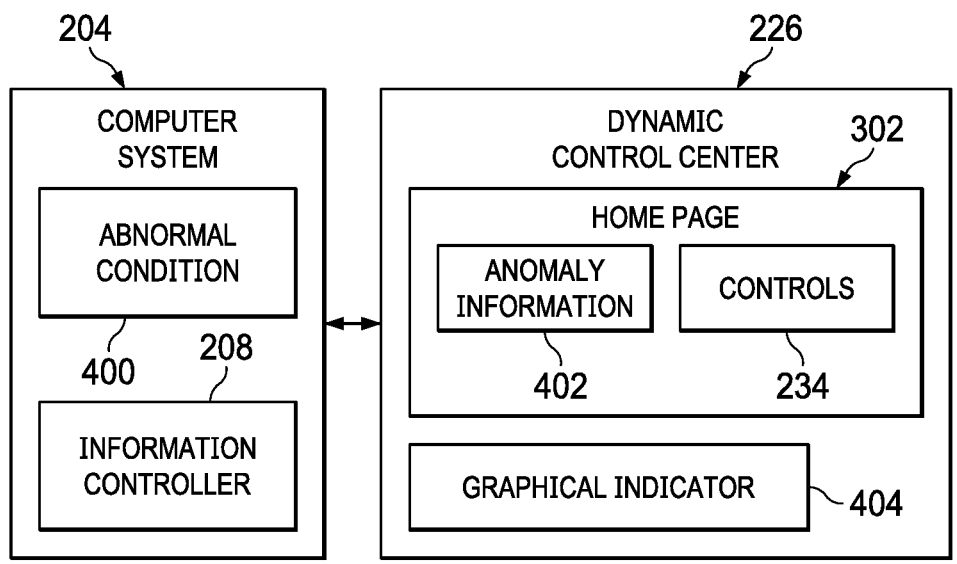
FIG. 4 is an illustration of a block diagram of anomaly information displayed in a dynamic control center in accordance with an illustrative embodiment.

With reference next to FIG. 4, an illustration of a block diagram of anomaly information displayed in a dynamic control center is depicted in accordance with an illustrative embodiment. In this illustrative example, information 232 in FIG. 2 can also change dynamically in response to an occurrence of a condition or change in a state of aircraft 202 in FIG. 2.

For example, information controller 208 can detect the presence of abnormal condition 400 in aircraft 202. This detection of abnormal condition 400 can be performed in a number of different ways. For example, abnormal condition 400 can be detected from information received or requested from at least one of an engine-indicating and crew-alerting system (EICAS), an environmental system, or some other data processing system within computer system 204 in aircraft 202.

In response to detecting abnormal condition 400 for aircraft 202, information controller 208 displays anomaly information 402 in dynamic control center 226 and graphical indicator 404 in dynamic control center 226. Graphical indicator 404 is selected to draw the attention of an operator on the flight deck of aircraft 202. Graphical indicator 404 may also be selected to indicate the presence of abnormal condition 400. For example, graphical indicator 404 can be a flashing red icon. In another example, graphical indicator 404 can be a pop-up menu identifying a particular abnormal condition.

At least one of anomaly information 402 or a group of controls 234 relates to abnormal condition 400. In other words, the group of controls 234 can be controls that are used to perform operations with respect to abnormal condition 400. In one illustrative example, anomaly information 402 and the group of controls 234 can be displayed in dynamic home page 302.

As depicted, anomaly information 402 can include instructions for performing an operation in response to the presence of abnormal condition 400. Abnormal condition 400 can be any condition that is out-of-tolerance or range for desired operation of aircraft 202.

For example, abnormal condition 400 can be a malfunction in an entertainment system in a cabin of aircraft 202. As another example, abnormal condition 400 can be selected from a group comprising a loss of cabin pressure and an engine malfunction. With this example, dynamic home page 302 can display anomaly information 402 which provides instructions for an emergency descent or change to alternate airport in response to abnormal condition 400. The group of controls 234 can include controls used to perform the emergency descent or change to alternate airport.

The illustration of aircraft control system 200 and the different components in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, other display devices can be present in display system 206 for displaying information. As another example, a group of display devices, in addition to display device 216, is present for other operators in addition to operator 218 when multiple operators are present in the flight crew in flight deck 225 of aircraft 202.

Figure 5:
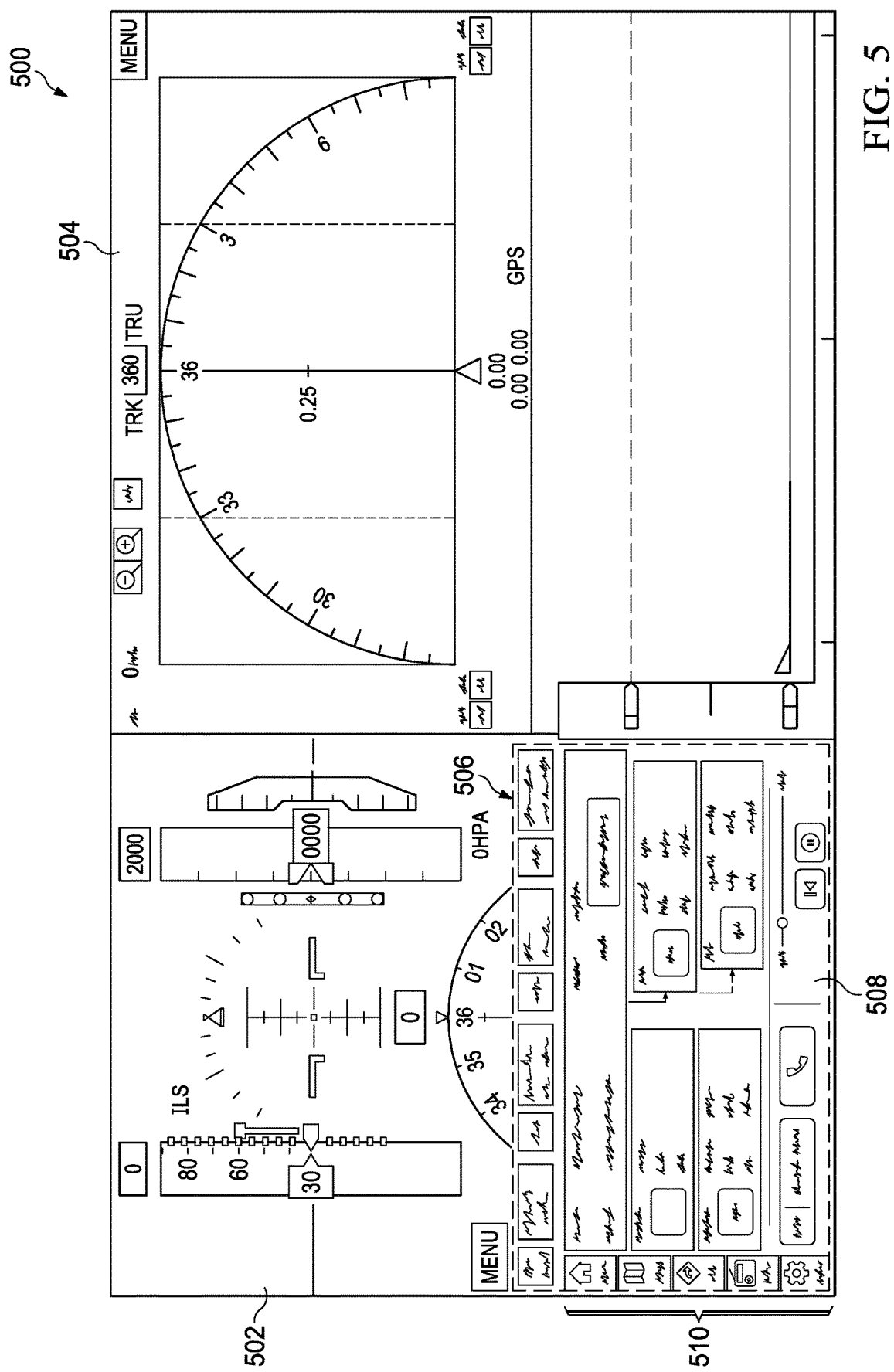
FIG. 5 is an illustration of a graphical user interface displayed on a display device in a flight deck of an aircraft in accordance with an illustrative embodiment.

Turning next to FIG. 5, an illustration of a graphical user interface displayed on a display device in a flight deck of an aircraft is depicted in accordance with an illustrative embodiment. As depicted, graphical user interface 500 is an example of an implementation for graphical user interface 212 shown in block form in FIG. 2. As depicted, graphical user interface 500 can be displayed on display device 216 in display system 206 for aircraft 202 in FIG. 2.

In this illustrative example, graphical user interface 500 includes a number of different types of displays that may be used by a flight crew. As depicted, graphical user interface 500 includes primary flight display 502, navigation display 504, and dynamic control center 506. These types of displays in graphical user interface 500 reduce the number of display devices needed in the flight deck of the aircraft to present information to the flight crew operating the aircraft.

As can be seen in this illustrative example, dynamic home page 508 is displayed in dynamic control center 506. Further, page selections 510 are also displayed in dynamic control center 506.

Figure 6:
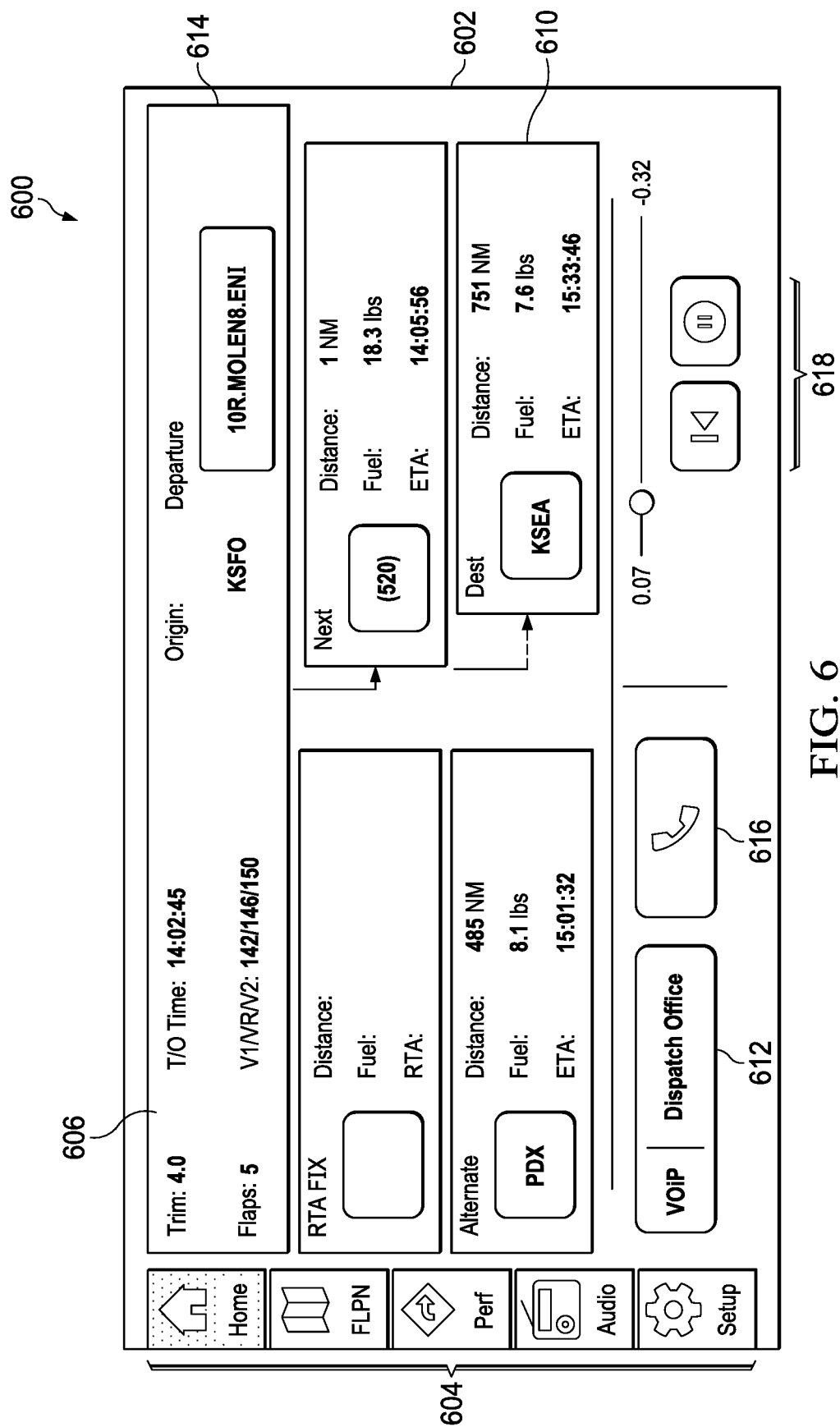
FIG. 6 is an illustration of a dynamic control center for an aircraft on-ground in accordance with an illustrative embodiment.

With reference now to FIGS. 6-13, illustrations of a dynamic control center displayed in a graphical user interface is depicted in accordance with an illustrative embodiment. Turning first to FIG. 6, an illustration of a dynamic control center for an aircraft on-ground is depicted in accordance with an illustrative embodiment. As depicted, dynamic control center 600 is an example of one implementation for dynamic control center 226 shown in block form in FIG. 2 and dynamic control center 506 in FIG. 5.

In this depicted example, dynamic control center 600 includes dynamic home page 602 and page selections 604. Dynamic home page 602 is a default page display in dynamic control center 600. Page selections 604 are used to change the page display by dynamic control center 600. User input selecting a page selection in page selections 604 causes the page assigned or associated with that page selection to be displayed in dynamic home page 602.

The information displayed on dynamic home page 602 is information used by the flight crew when the aircraft is on the ground. The information selected for dynamic home page 602 is information used when the aircraft is on the ground. Further, this information also may be used in different phases of flight while the aircraft is on the ground, such as at a gate and taxiing. On ground also may be a phase of flight that encompasses any time the aircraft is on the ground.

As depicted, dynamic home page 602 in dynamic control center 600 displays information that includes takeoff settings 606, waypoints 610, communications information 612, and departure procedure 614. Also displayed in dynamic home page 602 are call control 616 and message controls 618.

Figure 7:
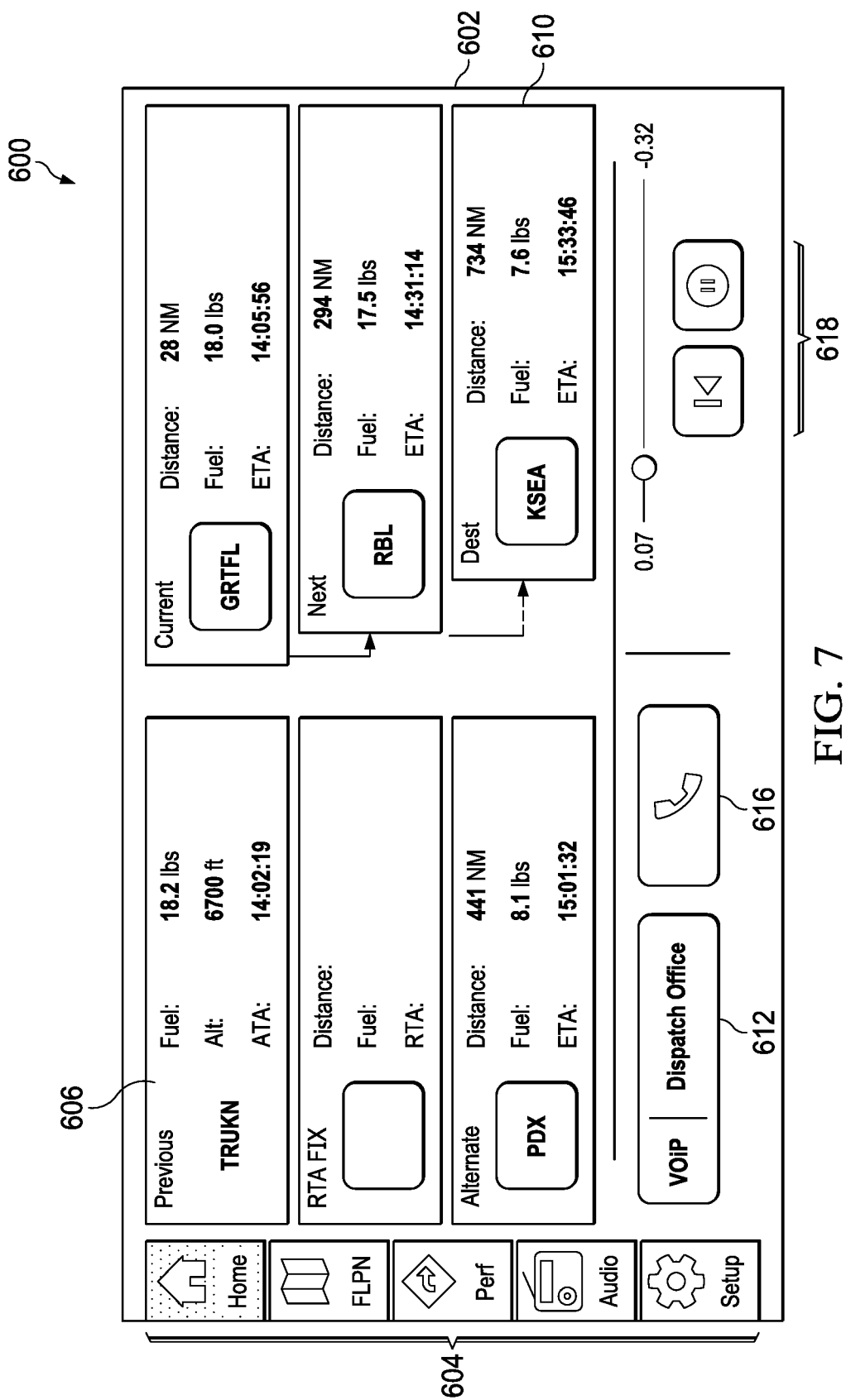
FIG. 7 is an illustration of a dynamic control center with a dynamic home page for an aircraft taking off, climbing, or cruising in accordance with an illustrative embodiment.

With reference now to FIG. 7, an illustration of a dynamic control center with a dynamic home page for an aircraft taking off, climbing, or cruising is depicted in accordance with an illustrative embodiment. In this illustrative example, the information in dynamic home page 602 is based on information needed for phases of flight such as takeoff, climbing, and cruising.

In this depicted example, the information displayed on dynamic home page 602 includes waypoints 610, and communications information 612. Also shown is call control 616 and message controls 618. In this example, the information for waypoints 610 is increased to include previous and current waypoints.

Figure 8:
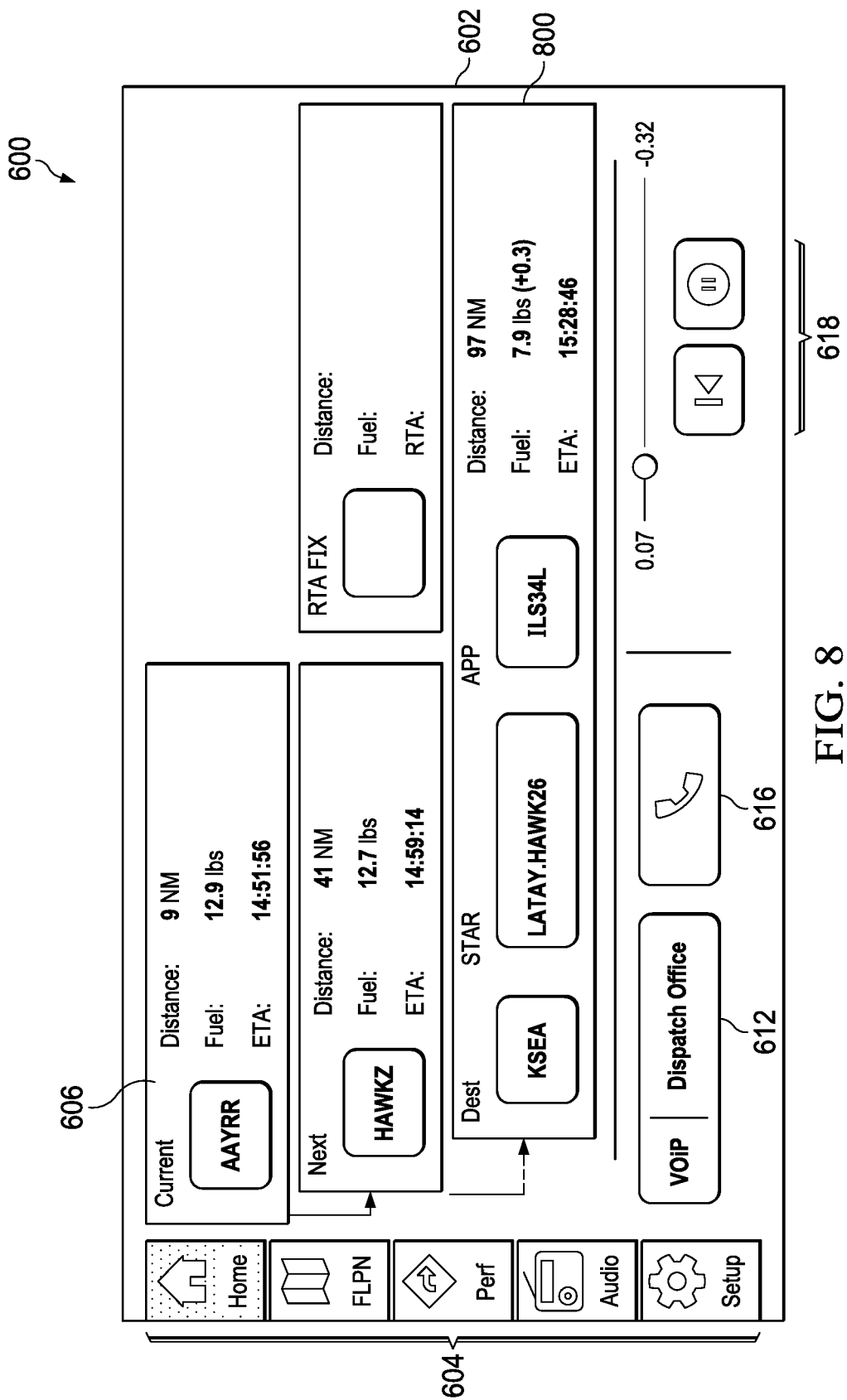
FIG. 8 is an illustration of a dynamic control center with a dynamic home page for an aircraft descending or landing in accordance with an illustrative embodiment.

With reference now to FIG. 8, an illustration of a dynamic control center with a dynamic home page for an aircraft descending or landing is depicted in accordance with an illustrative embodiment. In this illustrative example, the information in dynamic home page 602 is based on information needed for phases of flight such as descent and landing.

In this depicted example, the information displayed on dynamic home page 602 includes approach procedure and waypoints 800 and communications information 612. Also illustrated in this figure is call control 616 and message controls 618.

Figure 9:
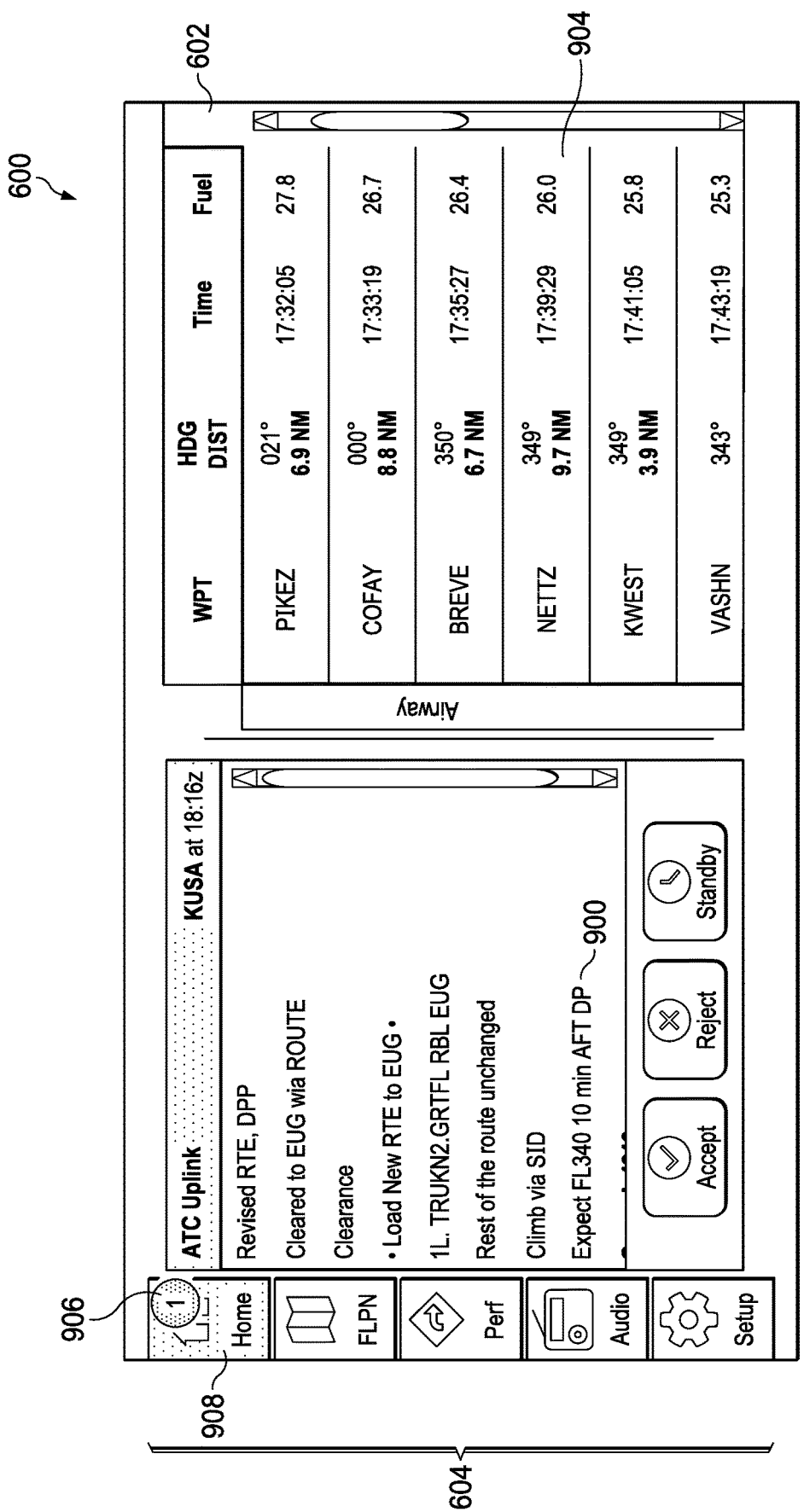
FIG. 9 is an illustration of a dynamic control center with an air traffic control message in a dynamic home page in accordance with an illustrative embodiment.

With reference next to FIG. 9, an illustration of a dynamic control center with an air traffic control message in a dynamic home page is depicted in accordance with an illustrative embodiment. In this figure, dynamic home page 602 has changed to show air traffic control messages 900. Additionally, message controls 902 are also displayed on dynamic home page 602 to enable a flight crew member to perform operations with respect to air traffic control messages 900. In addition, modified flight plan 904 is displayed in dynamic home page 602. Further, graphical indicator 906 is displayed on home page selection 908 in page selections 604 to draw the attention of the flight crew. Graphical indicator 906 is used to indicate that new information is available for viewing.

In this illustrative example, air traffic control datalink messages can be displayed to the flight crew. This display can occur when a new message is received rather than having dedicated full-time space in dynamic home page 602. This type of display is performed to avoid interrupting an ongoing task that may involve using one of the other displays on a display device.

Figure 10:
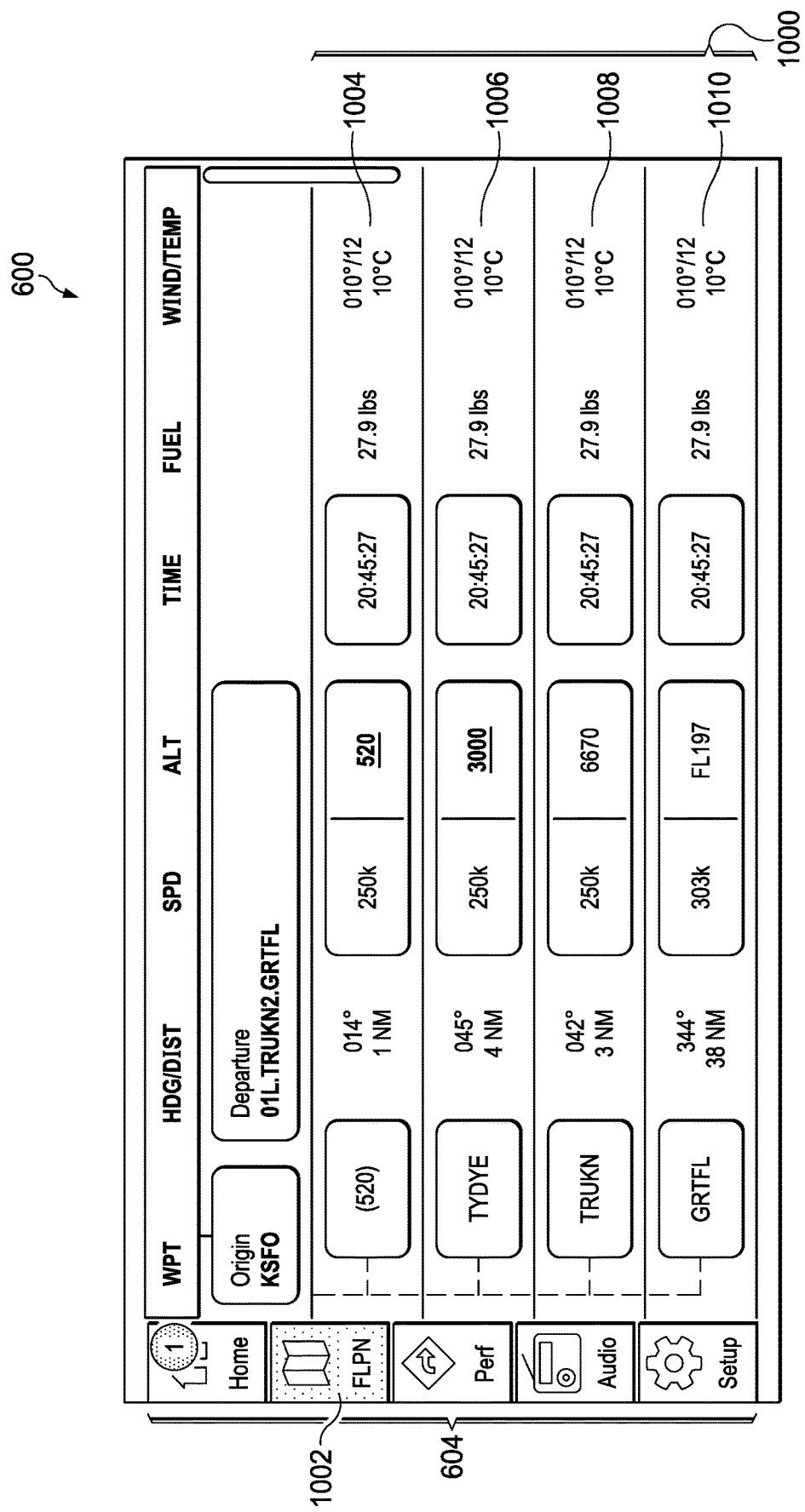
FIG. 10 is an illustration of a flight plan page in a dynamic control center in accordance with an illustrative embodiment.

In FIG. 10, an illustration of a flight plan page in a dynamic control center is depicted in accordance with an illustrative embodiment. In this example, flight plan page 1000 is displayed in dynamic control center 600. Flight plan page 1000 is displayed in response to selecting page selection 1002 in page selections 604. In this example, flight plan page 1000 is interactive such that the flight crew is able to select and enter constraints for waypoint 1004, waypoint 1006, waypoint 1008, and waypoint 1010 displayed in flight plan page 1000.

Figure 11:
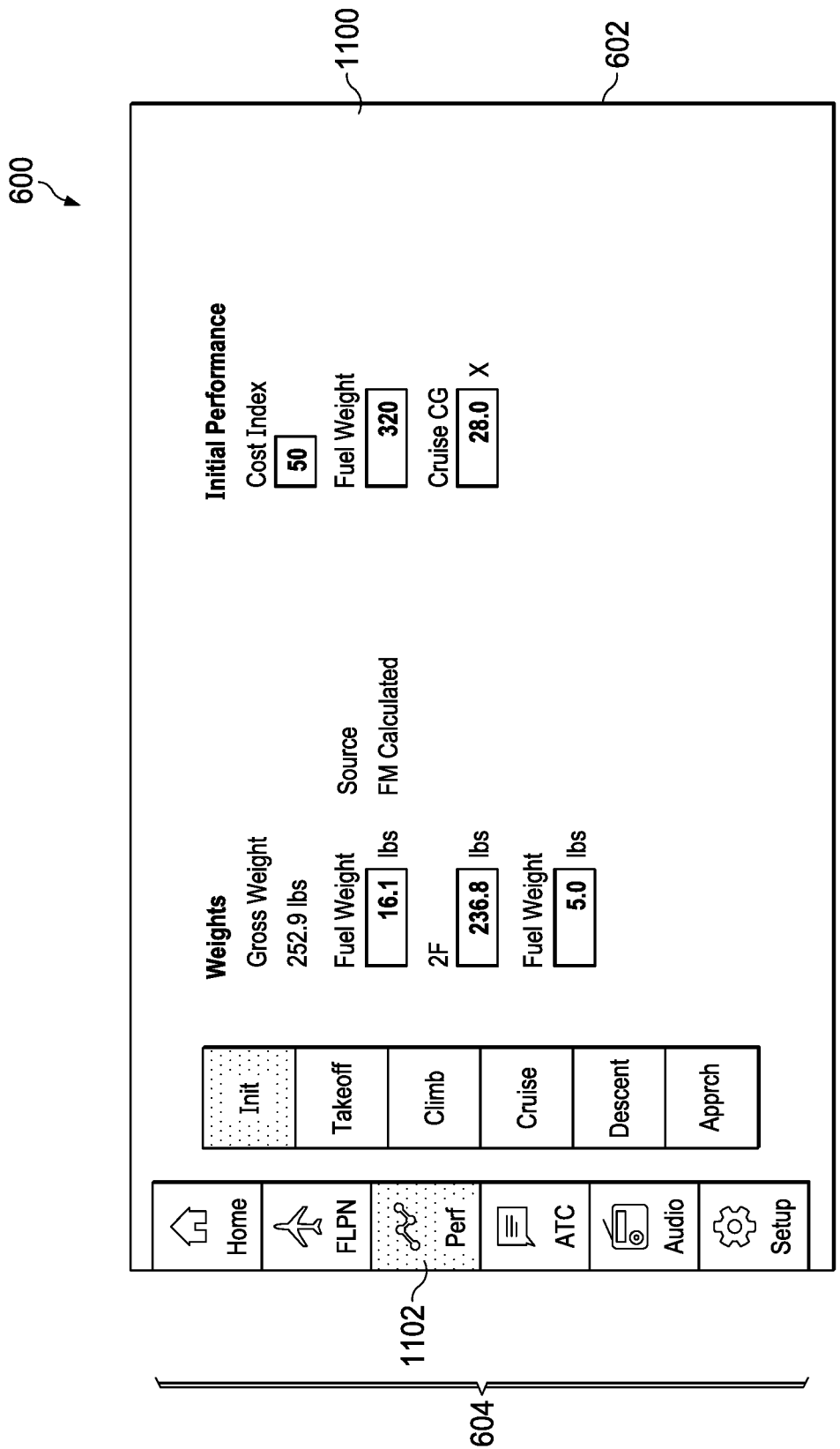
FIG. 11 is an illustration of a performance page in a dynamic control center in accordance with an illustrative embodiment.

With reference to FIG. 11, an illustration of a performance page in a dynamic control center is depicted in accordance with an illustrative embodiment. In this example, performance page 1100 is displayed in dynamic control center 600 in response to selecting page selection 1102 in page selections 604. In this example, initial flight management inputs can be made by a flight crew member. Additionally, flight management inputs can be made for different phases of flight using performance page 1100.

Figure 12:
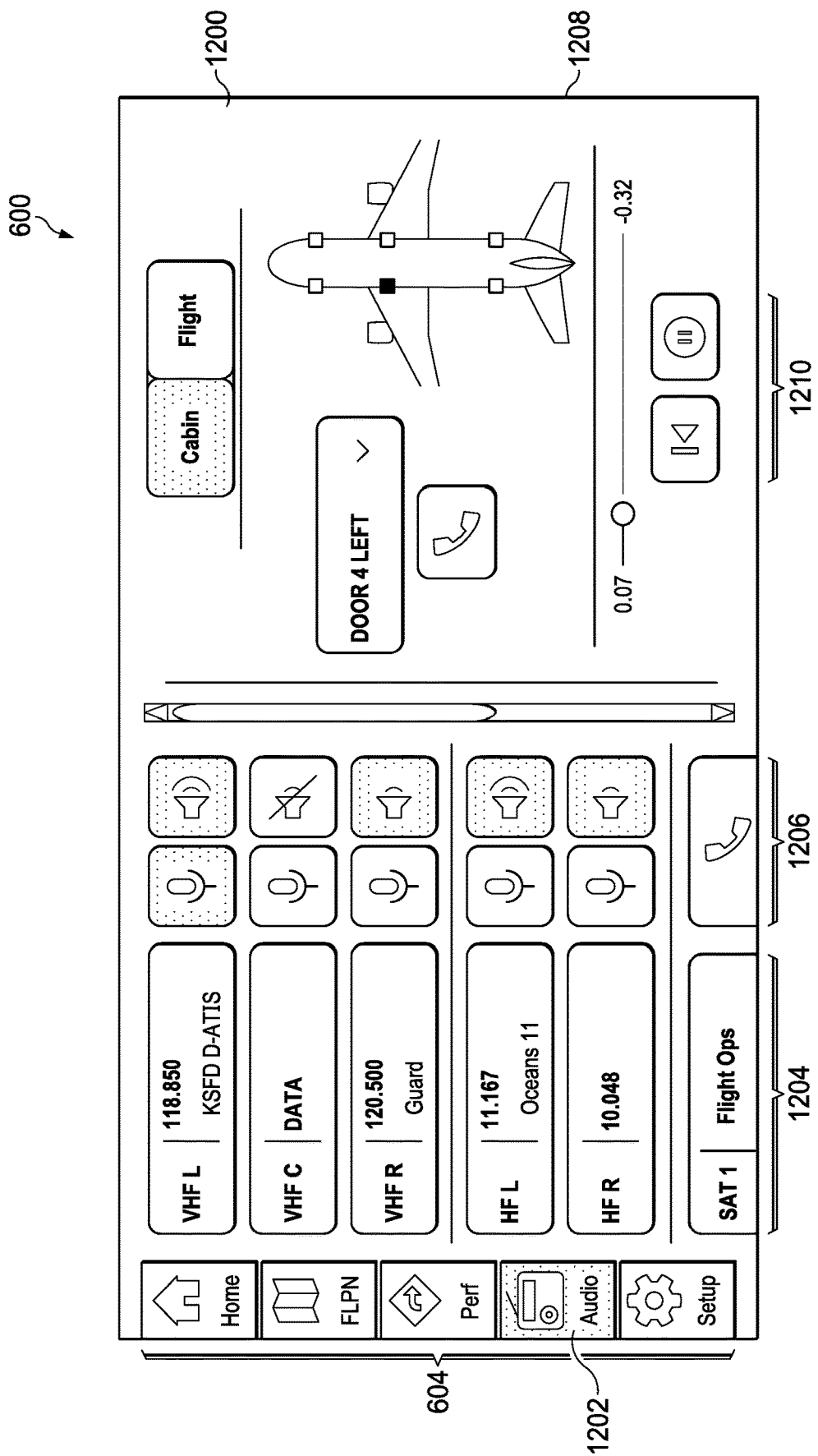
FIG. 12 is an illustration of an audio page in a dynamic control center in accordance with an illustrative embodiment.

Turning next to FIG. 12, an illustration of an audio page in a dynamic control center is depicted in accordance with an illustrative embodiment. In this illustrative example, audio page 1200 is displayed in dynamic control center 600 in response to a selection of page selection 1202 in page selections 604.

In this depicted example, communications radio 1204 used while operating the aircraft are displayed in audio page 1200. Additionally, controls 1206 are present for communications radio 1204. Further, intercom controls 1208 are available on audio page 1200. Playback controls 1210 enable the flight crew to replay instructions that may be received over a radio call on communications radio 1204. This feature may be used in case the flight crew did not understand a call or needs to hear part of instructions again.

Figure 13:
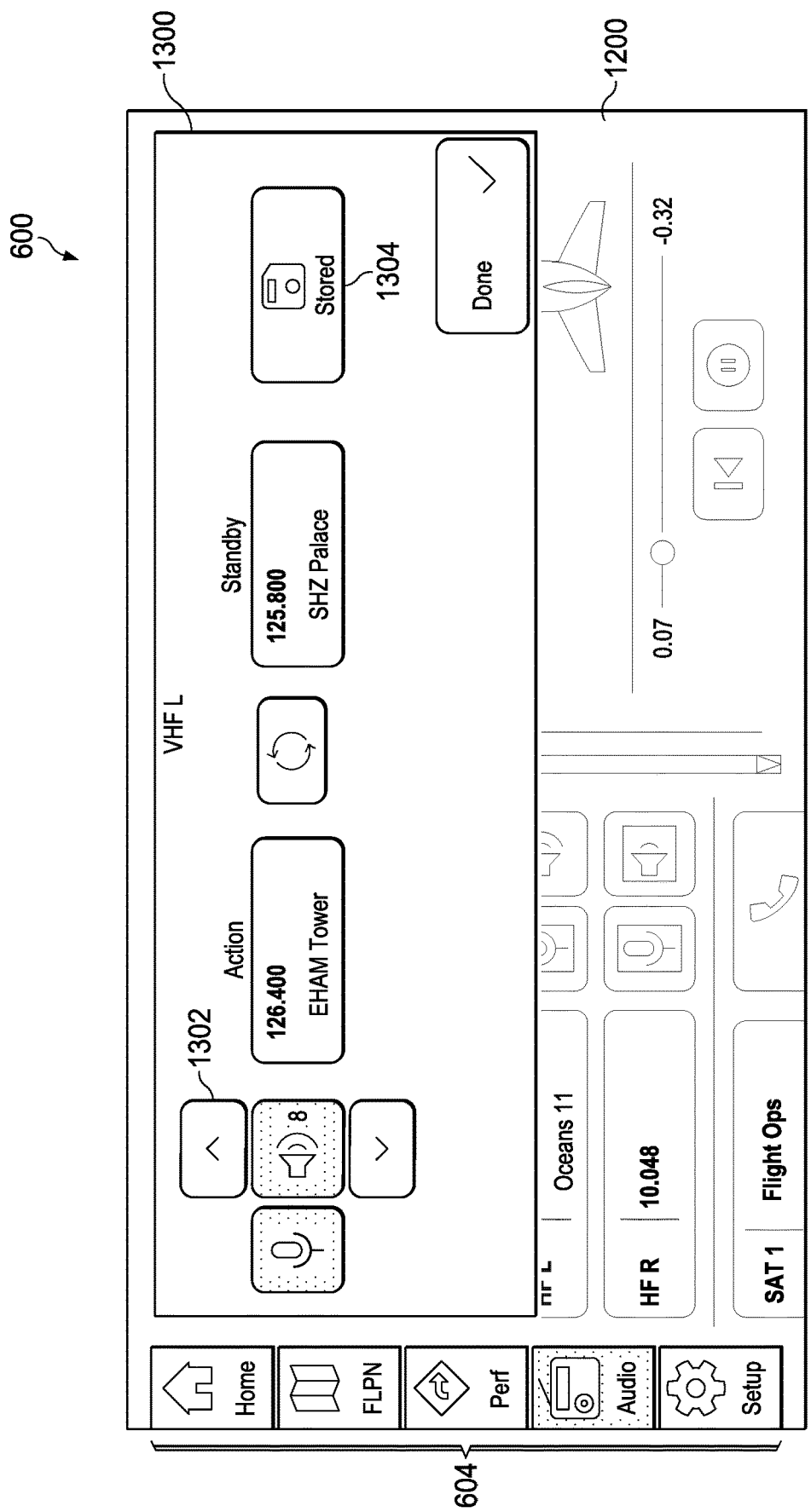
FIG. 13 is an illustration of an audio page with a pop-up menu in accordance with an illustrative embodiment.

With reference to FIG. 13, an illustration of an audio page with a pop-up menu is depicted in accordance with an illustrative embodiment. As depicted, pop-up window 1300 is displayed on audio page 1200. This pop-up can be made by selecting a communications radio in communications radio 1204 in FIG. 12. In this example, VHFL in communications radio 1204 has been selected.

As depicted, pop-up window 1300 provides additional controls in addition to controls 1206 in audio page 1200. In this example, volume control 1302 enables a flight crew member to increase or decrease the volume for a radio. Additionally, stored control 1304 enables selecting from a known list of pertinent radio channels.

In this example, dynamic home page 602 is obscured or grayed out. The change to dynamic control center 600 helps draw attention to pop-up window 1300.

The illustration of graphical user interface 500 in FIG. 5 and dynamic control center 600 in FIGS. 6-13 are shown as examples of one manner in which a graphical user interface and a dynamic control center can be implemented. These illustrations are not meant to limit the manner in which other illustrative examples can be implemented. For example, in another illustrative example, other numbers of pages can be displayed in addition to or in place of the ones shown in FIGS. 6-13. For example, information specifically for landing the aircraft can be shown in a separate page that can be selected by the flight crew during the landing of the aircraft.

Figure 14:
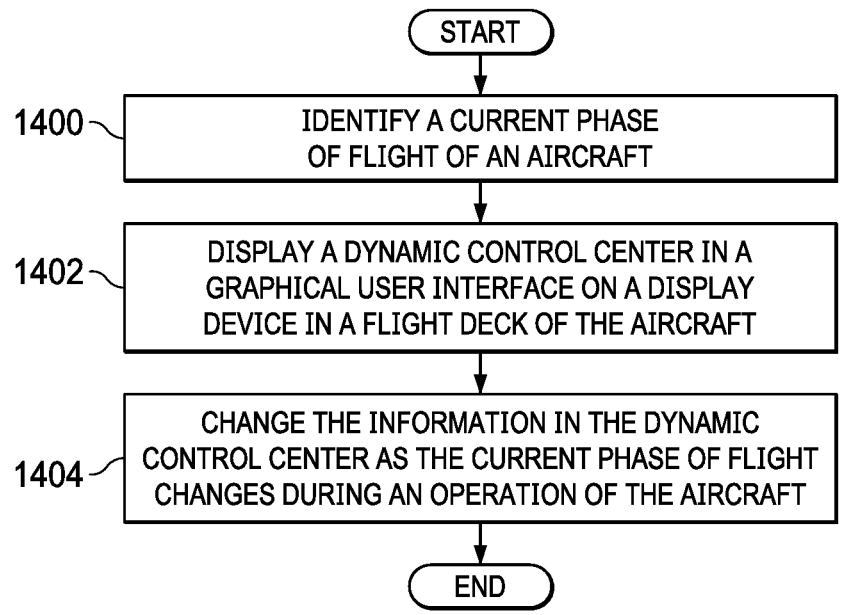
FIG. 14 is an illustration of a flowchart of a process for displaying information for an aircraft on a display device in a flight deck of the aircraft in accordance with an illustrative embodiment.

Turning next to FIG. 14, an illustration of a flowchart of a process for displaying information for an aircraft on a display device in a flight deck of the aircraft is depicted in accordance with an illustrative embodiment. The process illustrated in FIG. 14 can be implemented in at least one of software or hardware. With software, the program code is used to implement the different operations in the flowchart. In this example the operation can be implemented in information controller 208 running on computer system 204 in aircraft 202 in FIG. 2.

The process begins by identifying a current phase of flight of an aircraft (operation 1400). The current phase of flight can be identified from a data processing system in a computer system in the aircraft. The data processing system can be, for example, a flight management system.

The process displays a dynamic control center in a graphical user interface on a display device in a flight deck of the aircraft (operation 1402). Information in the dynamic control center is based on the information used by a flight crew to operate the aircraft during a current phase of flight of the aircraft.

The process changes information in the dynamic control center as the current phase of flight changes during an operation of the aircraft (operation 1404). The process terminates thereafter.

Figure 15:
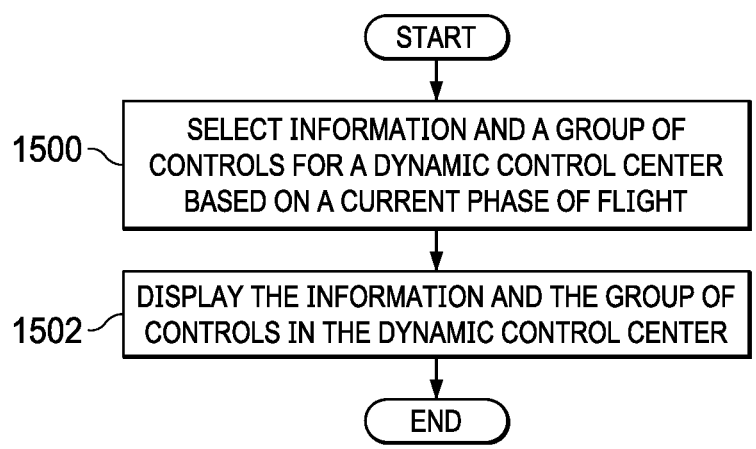
FIG. 15 is an illustration of a flowchart of a process for displaying a dynamic control center in a graphical user interface in accordance with an illustrative embodiment.

Turning next to FIG. 15, an illustration of a flowchart of a process for displaying a dynamic control center in a graphical user interface is depicted in accordance with an illustrative embodiment. The process illustrated in FIG. 15 is an example of an implementation of operation 1402 in FIG. 14.

The process begins by selecting information and a group of controls for a dynamic control center based on a current phase of flight (operation 1500). The process displays the information and the group of controls in the dynamic control center (operation 1502). The process terminates thereafter.

Figure 16:
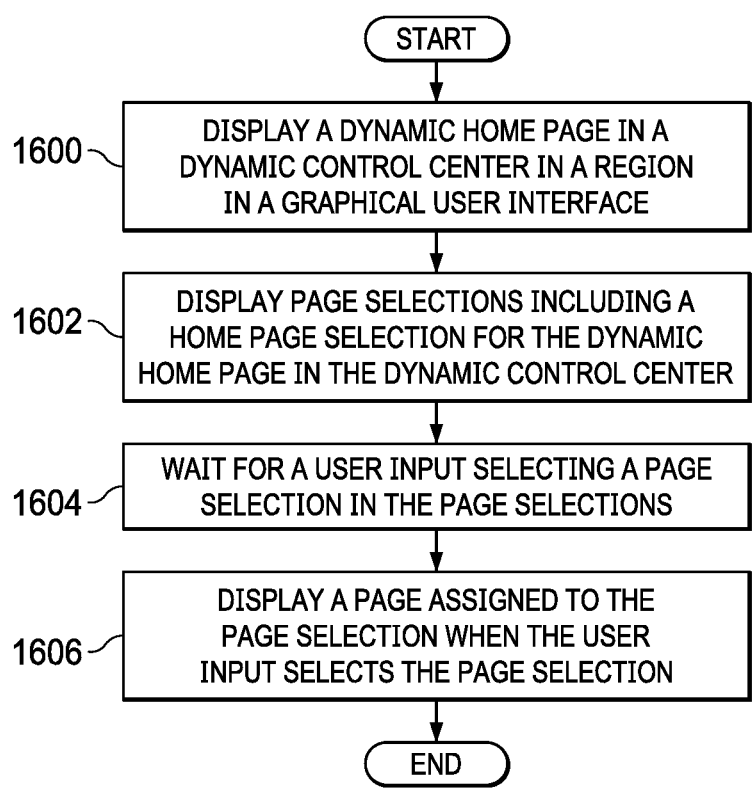
FIG. 16 is an illustration of a flowchart of a process for displaying a dynamic control center in a graphical user interface in accordance with an illustrative embodiment.

With reference next to FIG. 16, an illustration of a flowchart of a process for displaying a dynamic control center in a graphical user interface is depicted in accordance with an illustrative embodiment. The process illustrated in FIG. 16 is an example of an implementation of operation 1402 in FIG. 14.

The process begins by displaying a dynamic home page in a dynamic control center in a region in a graphical user interface (operation 1600). The process displays page selections including a home page selection for the dynamic home page in the dynamic control center (operation 1602).

The process waits for a user input selecting a page selection in page selections (operation 1604). The process displays a page assigned to the page selection when the user input selects the page selection (operation 1606). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 17:
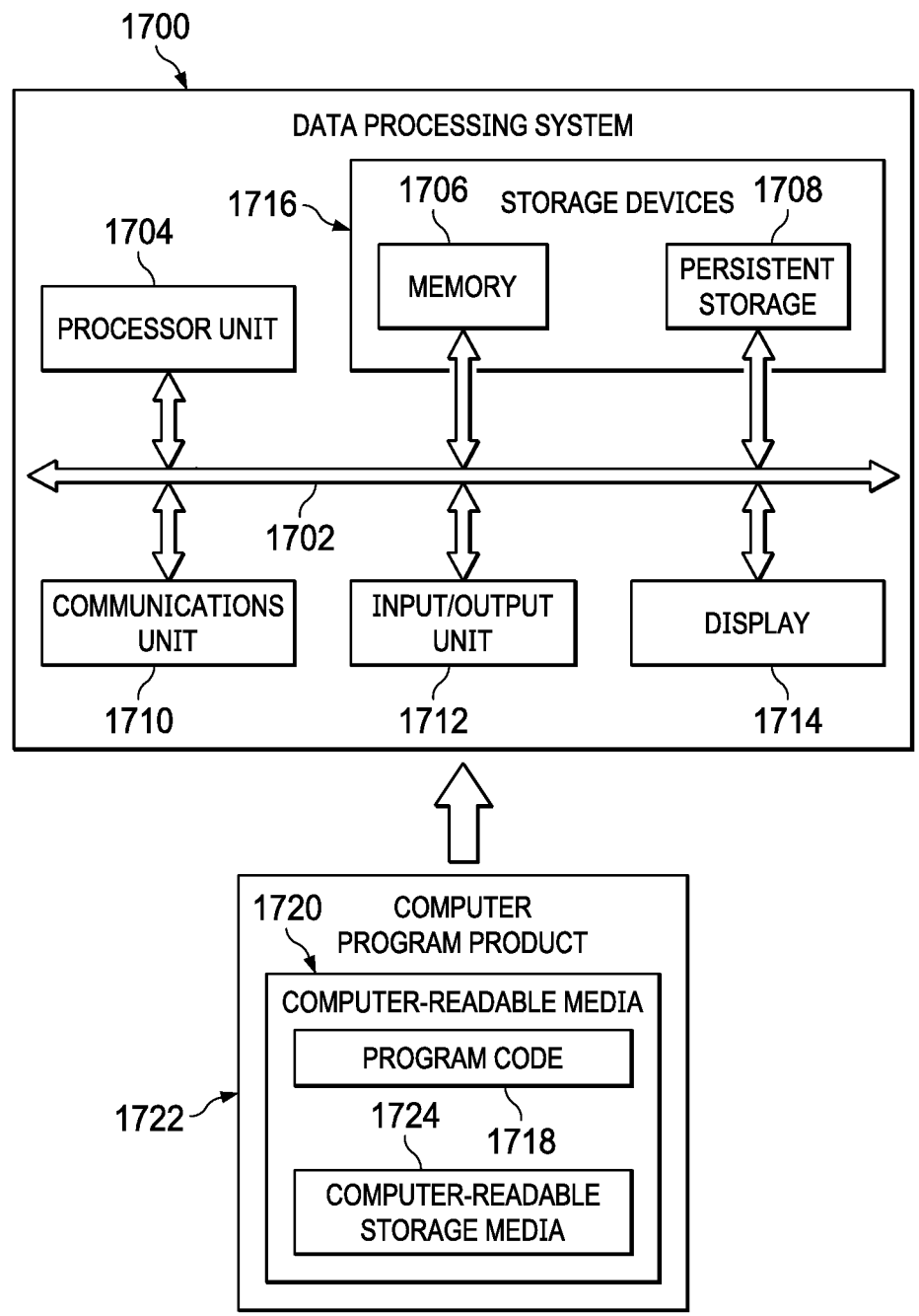
FIG. 17 is an illustration of a block diagram of a data processing system in accordance with an illustrative embodiment.

Turning now to FIG. 17, an illustration of a block diagram of a data processing system is depicted in accordance with an illustrative embodiment. Data processing system 1700 may be used to implement computer system 204 in FIG. 2.

In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 may take the form of a bus system.

Processor unit 1704 serves to execute instructions for software that may be loaded into memory 1706. Processor unit 1704 may be a number of processors, a multi-processor core, or some other type of processor, depending on the particular implementation.

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1716 may also be referred to as computer-readable storage devices in these illustrative examples. Memory 1706, in these examples, may be, for example, a random-access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a solid-state drive (SSD), a flash memory, a rewritable optical disk, a rewritable magnetic tape, or some combination of the above. The media used by persistent storage 1708 also may be removable. For example, a removable hard drive may be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that may be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs may be located in storage devices 1716, which are in communication with processor unit 1704 through communications framework 1702. The processes of the different embodiments may be performed by processor unit 1704 using computer-implemented instructions, which may be located in a memory, such as memory 1706.

These instructions are referred to as program code, computer usable program code, or computer-readable program code that may be read and executed by a processor in processor unit 1704. The program code in the different embodiments may be embodied on different physical or computer-readable storage media, such as memory 1706 or persistent storage 1708.

Program code 1718 is located in a functional form on computer-readable media 1720 that is selectively removable and may be loaded onto or transferred to data processing system 1700 for execution by processor unit 1704. Program code 1718 and computer-readable media 1720 form computer program product 1722 in these illustrative examples. In the illustrative example, computer-readable media 1720 is computer-readable storage media 1724.

In these illustrative examples, computer-readable storage media 1724 is a physical or tangible storage device used to store program code 1718 rather than a medium that propagates or transmits program code 1718.

Alternatively, program code 1718 may be transferred to data processing system 1700 using a computer-readable signal media. The computer-readable signal media may be, for example, a propagated data signal containing program code 1718. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700. Other components shown in FIG. 17 can be varied from the illustrative examples shown. The different embodiments may be implemented using any hardware device or system capable of running program code 1718.

Figure 18:
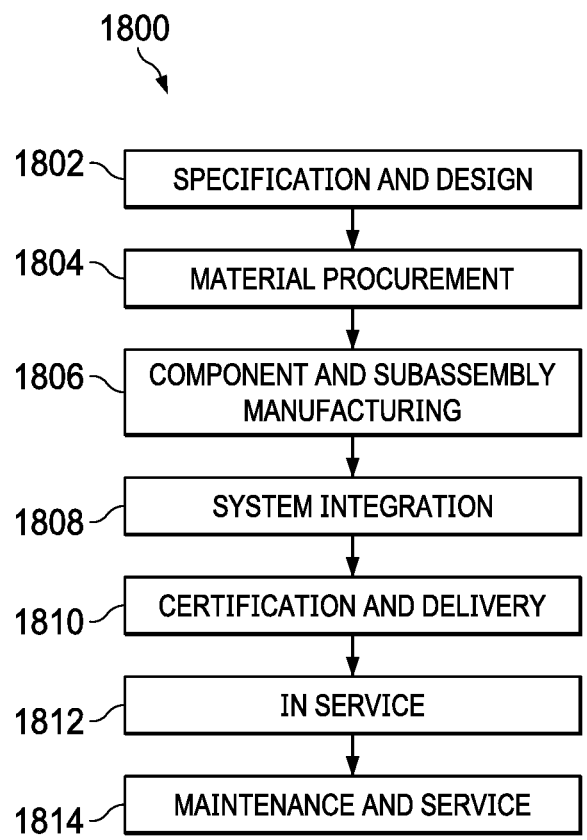
FIG. 18 is an illustration of a block diagram of an aircraft manufacturing and service method in accordance with an illustrative embodiment.
Figure 19:
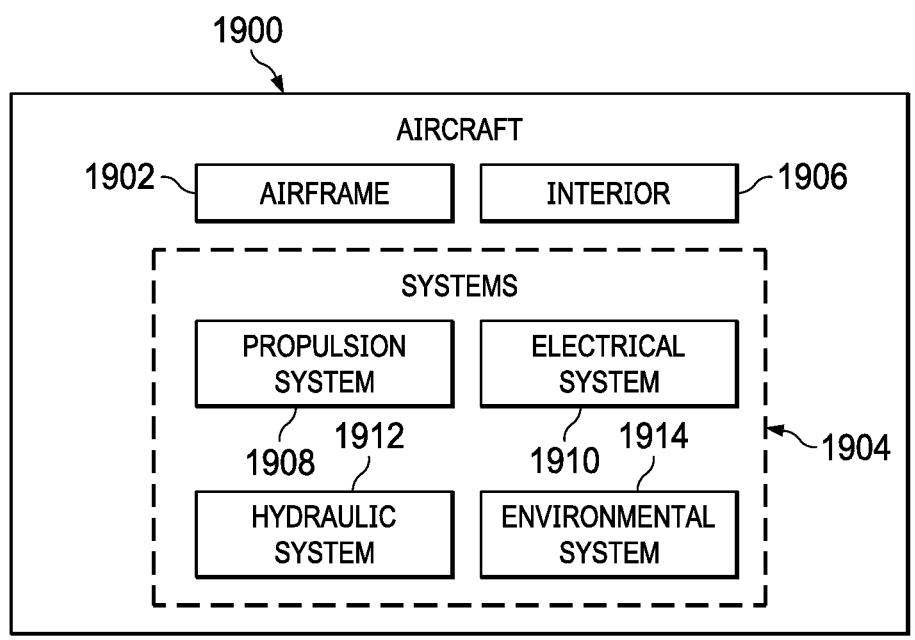
FIG. 19 is an illustration of a block diagram of an aircraft in which an illustrative embodiment may be implemented.

Illustrative embodiments of the disclosure may be described in the context of aircraft manufacturing and service method 1800 as shown in FIG. 18 and aircraft 1900 as shown in FIG. 19. Turning first to FIG. 18, an illustration of a block diagram of an aircraft manufacturing and service method is depicted in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 takes place. Thereafter, aircraft 1900 may go through certification and delivery 1810 in order to be placed in service 1812. While in service 1812 by a customer, aircraft 1900 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of a block diagram of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914.

In this illustrative example, computer system 204 with information controller 208 in FIG. 2 can be implemented in electrical system 1910. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1800 in FIG. 18.

In one illustrative example, components or subassemblies produced in component and subassembly manufacturing 1806 in FIG. 18 may be fabricated or manufactured in a manner similar to components or subassemblies produced while aircraft 1900 is in service 1812 in FIG. 18. As yet another example, one or more apparatus embodiments, method embodiments, or a combination thereof may be utilized during production stages, such as component and subassembly manufacturing 1806 and system integration 1808 in FIG. 18. One or more apparatus embodiments, method embodiments, or a combination thereof may be utilized while aircraft 1900 is in service 1812, during maintenance and service 1814 in FIG. 18, or both. For example, information controller 208 in FIG. 2 can be used during operation of aircraft 1900 to display dynamic control center 226 in FIG. 2 while aircraft 1900 is in service 1814. In another example, information controller 208 can be installed on aircraft 1900 during maintenance and service 1814 as part of normal maintenance, reconfiguration, refurbishment, or upgrade of aircraft 1900.

The use of a number of the different illustrative embodiments may substantially expedite the assembly of aircraft 1900, reduce the cost of aircraft 1900, or both expedite the assembly of aircraft 1900 and reduce the cost of aircraft 1900. The use of information controller 208 to display dynamic control center 226 enables reducing the amount of hardware in the flight deck of an aircraft. With the reduced amount of hardware, assembly can be expedited and cost can be reduced. Further, increased space in the flight deck and reduced weight can be achieved for aircraft 1900.

Thus, the illustrative embodiments provide a method, an apparatus, and a system for displaying information on a display device in a flight deck of the aircraft. In one illustrative example, an aircraft control system comprises a computer system in the aircraft, a display device in the computer system, and an information controller running on the computer system. The information controller displays a dynamic control center in a region of a graphical user interface based on a current phase of flight of the aircraft. The information in the dynamic control center is based on the information referenced during the current phase of flight to operate the aircraft. The information in the dynamic control page changes as the current phase of flight changes.

As described above, a dynamic home page can be used to display the information referenced to operate the aircraft during the current phase of flight. Other pages can also be displayed to provide access to other types of information when desired by the flight crew.

Thus, the use of a dynamic control center reduces the need for physical audio, radio, datalink, and flight management control panels. Additionally, in the illustrative examples, the display system reduces the size of the aisle stand in the flight deck. Thus, with reducing the amount of space needed to display and provide controls to the flight crew to operate an aircraft, the comfort of pilots and other flight crew in the flight deck of an aircraft also can be increased.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft control system that comprises:
a display device configured to communicate with a computer system in an aircraft, wherein the display device is located in a flight deck of the aircraft as a forward display, and the computer system, comprises an information controller configured to:
display a dynamic control center in a graphical user interface on the display device in a region of the display device adjacent to a primary flight display on the display device and adjacent to a navigation display on the graphical user interface, wherein the dynamic control center is configured to present, on the dynamic control center, a group of controls configured to receive inputs to operate the aircraft;
identify a current phase of flight of the aircraft during an operation of the aircraft;
present, based upon a change in the current phase of flight, a new group of controls on the dynamic control center; and
present, on the dynamic control center, an audio page configured to control radio communications that comprises a playback control configured to replay a radio call received by the aircraft.

2. The aircraft control system of claim 1, wherein the information controller is further configured to display a page that corresponds to a page selection tab in the page selection tabs when a user input selects the page selection tab.

3. The aircraft control system of claim 1, wherein the information controller is further configured to present a graphical indicator on a page selection tab when new information is present for a page corresponding to the page selection tab on a dynamic home page of the dynamic control center.

4. The aircraft control system of claim 1, wherein the information controller is further configured to display anomaly information in a dynamic home page on the dynamic control center in response to an abnormal condition for the aircraft, wherein at least one of the anomaly information or the group of controls relates to the abnormal condition.

5. The aircraft control system of claim 4, wherein the dynamic home page is further configured to provide instructions for an emergency descent or a change to an alternate airport in response to the abnormal condition, and wherein the abnormal condition is selected from a group comprising a loss of cabin pressure and an engine malfunction.

6. The aircraft control system of claim 1, wherein the current phase of flight is selected from one of the following phases of flight: on ground, at a gate, taxiing, a take-off, climbing, cruising, a descent, and a landing.

7. An aircraft control system that comprises:
a computer system in an aircraft;
a display device in a flight deck on the aircraft configured to display a primary flight display and adjacent to a navigation display in a graphical user interface on the display device and to communicate with the computer system; and
an information controller on the computer system configured to present on the display device a dynamic home page in a dynamic control center, such that the dynamic control center is located in a region of the graphical user interface adjacent to the primary flight display and adjacent to the navigation display, wherein the dynamic home page is based on a current phase of flight of the aircraft and is one of a number of pages in the dynamic control center, and wherein the dynamic control center is configured to:
present, on the dynamic control center and based upon the current phase of flight, a group of controls configured to receive inputs to operate the aircraft;
reduce a number of displays and a number of physical: switches, levers, or dials, in the flight deck as compared to a configuration of the aircraft that lacks the dynamic control center; and
increase room available in the flight deck for ingress and egress, as compared to the configuration of the aircraft that lacks the dynamic control center;
present, based upon a change in the current phase of flight, a new group of controls on the dynamic control center; and
present, on the dynamic control center, an audio page configured to control radio communications that comprises a playback control configured to replay a radio call received by the aircraft.

8. The aircraft control system of claim 7, wherein the information controller is further configured to select the current phase of flight from one of the following phases of flight: at a gate, taxiing, taking off, climbing, cruising, descending, or landing.

9. The aircraft control system of claim 8, wherein the information controller is further configured to identify the current phase of flight based upon data from a flight management system for the aircraft.

10. The aircraft control system of claim 7, wherein the information controller is further configured to display a page assigned to a page selection tab in a plurality of page selection tabs on the dynamic control center when responsive to a selection of the page selection tab.

11. The aircraft control system of claim 7, wherein the information controller is further configured to display a graphical indicator on a page selection tab when new information is present for a page that corresponds to the page selection tab.

12. The aircraft control system of claim 7, wherein the information controller is further configured to display anomaly information in the dynamic control center in response to an abnormal condition for the aircraft, wherein at least one of the anomaly information or the new group of controls relates to the abnormal condition.

13. The aircraft control system of claim 12, wherein the dynamic control center is further configured to provide instructions for an emergency descent or a change to an alternate airport in response to the abnormal condition.

14. The aircraft control system of claim 12, wherein the abnormal condition is one of: a loss of cabin pressure, and an engine malfunction.

15. The aircraft control system of claim 7, wherein the information controller is further configured to change content on the dynamic control center to remain relevant to the current phase of flight.

16. The aircraft control system of claim 7, wherein the display device is located in the flight deck of the aircraft as a forward display.

17. A method for controlling an operation of an aircraft, the method comprising:
installing a display device comprising a graphical user interface comprising a dynamic control center comprising a dynamic home page in a flight deck of the aircraft
displaying, by a computer system in the aircraft communicating with the display device, the dynamic home page adjacent to a primary flight display and adjacent to a navigation display on the graphical user interface;
identifying, by the computer system, a current phase of flight of the aircraft during the operation of the aircraft;
presenting, on the dynamic control center and using the current phase of flight, a group of controls for receiving inputs for operating the aircraft;
controlling the operation of the aircraft using inputs received by the group of controls;
presenting, based upon a change in the current phase of flight, a new group of controls on the dynamic control center; and
presenting, on the dynamic control center, an audio page configured to control radio communications comprising a playback control for replaying a radio call received by the aircraft; and
changing, by the computer system in the aircraft, information in the dynamic home page as the current phase of flight changes during the operation of the aircraft.

18. The method of claim 17, further comprising:
removing from the flight deck: a number of displays and a number of physical: switches, levers, or dials, present in the flight deck before installing the dynamic control center; and
increasing room available in the flight deck for ingress and egress, as compared to a configuration of the aircraft before removing from the flight deck the number of displays and the number of physical: switches, levers, or dials, present in the flight deck before installing the dynamic control center.

19. The method of claim 17 further comprising:
identifying, by the computer system in the aircraft, the current phase of flight using a flight management system for the aircraft.

20. The method of claim 17 further comprising:
detecting, by the computer system in the aircraft, a user input selecting a page selection tab in a plurality of page selection tabs; and
displaying, by the computer system in the aircraft, a page corresponding to the page selection tab when the user input selects the page selection tab.

21. The method of claim 20 further comprising:
displaying, by the computer system in the aircraft, a graphical indicator on the page selection tab when new information is present for the page assigned to the page selection tab.

22. The method of claim 17 further comprising:
displaying, by the computer system in the aircraft, anomaly information in the dynamic home page in response to an abnormal condition for the aircraft, wherein at least one of the anomaly information or the new group of controls relates to the abnormal condition.

23. The method of claim 22, wherein the dynamic home page provides instructions for an emergency descent or a change to an alternate airport in response to the abnormal condition.

\* \* \* \* \*